US008966083B2

(12) United States Patent  (10) Patent No.: US 8,966,083 B2
Javaid et al.  (45) Date of Patent: Feb. 24, 2015

(54) MANAGEMENT OF A COMMUNICATION IN A HETEROGENEOUS NETWORK

(75) Inventors: Usman Javaid, Newbury (GB); Djamal-Eddine Meddour, Lannion (FR); Toufik Ahmed, Talence (FR)

(73) Assignee: Orange, Paris (FR)

( * ) Notice: Subject to any disclaimer, the term of this patent is extended or adjusted under 35 U.S.C. 154(b) by 617 days.

(21) Appl. No.: 12/808,783

(22) PCT Filed: Dec. 5, 2008

(86) PCT No.: PCT/FR2008/052227
§ 371 (c)(1),
(2), (4) Date: Jun. 17, 2010

(87) PCT Pub. No.: WO2009/080959
PCT Pub. Date: Jul. 2, 2009

(65) Prior Publication Data
US 2010/0274900 A1  Oct. 28, 2010

(30) Foreign Application Priority Data
Dec. 17, 2007  (FR) ...................................... 07 59907

(51) Int. Cl.
G06F 15/173  (2006.01)
H04W 48/18  (2009.01)
H04B 7/26  (2006.01)
H04W 36/00  (2009.01)
H04W 88/04  (2009.01)

(52) U.S. Cl.
CPC .............. *H04W 48/18* (2013.01); *H04B 7/2606* (2013.01); *H04W 36/005* (2013.01); *H04W 88/04* (2013.01)
USPC .......................................... 709/226; 709/223

(58) Field of Classification Search
CPC ..... H04L 45/00; H04L 47/724; H04L 47/805; H04L 65/80; H04W 72/10
USPC .................................................. 709/223, 226
See application file for complete search history.

(56) References Cited

U.S. PATENT DOCUMENTS

| 7,656,822 | B1 * | 2/2010 | AbdelAziz et al. ........... 370/255 |
| 8,184,550 | B2 * | 5/2012 | Beck et al. .................... 370/252 |
| 2002/0026527 | A1 * | 2/2002 | Das et al. ...................... 709/245 |
| 2004/0095932 | A1 * | 5/2004 | Astarabadi et al. ........... 370/389 |
| 2005/0078679 | A1 * | 4/2005 | Henry et al. ............... 370/395.2 |
| 2007/0264995 | A1 | 11/2007 | Feder et al. |

FOREIGN PATENT DOCUMENTS

WO  WO 2006/125085 A2  11/2006

OTHER PUBLICATIONS

Clausen et al., "Optimized Link State Routing Protocol (OLSR); RFC 3626," Project Hipercom, INRIA, pp. 1-75 (Oct. 2003).

* cited by examiner

*Primary Examiner* — Phuoc Nguyen
(74) *Attorney, Agent, or Firm* — Drinker Biddle & Reath LLP (57) ABSTRACT

A communication of a first terminal is managed in a communication network comprising subnetworks. The first terminal can communicate with at least one second terminal and at least one subnetwork of the network is accessible via this second terminal. At the level of the first terminal, information relating to resources of the subnetwork which is accessible via the second terminal is received from the second terminal. On the basis of this information, a subnetwork is selected for the communication of the first terminal from among a set of subnetworks of the network comprising at least this subnetwork accessible via the second terminal.

17 Claims, 5 Drawing Sheets

MANAGEMENT OF A COMMUNICATION IN A HETEROGENEOUS NETWORK

CROSS-REFERENCE TO RELATED APPLICATIONS

This application is the U.S. national phase of the International Patent Application No. PCT/FR2008/052227 filed Dec. 5, 2008, which claims the benefit of French Application No. 07 59907 filed Dec. 17, 2007, the entire content of which is incorporated herein by reference.

FIELD OF THE INVENTION

This invention relates to a communications network comprising a plurality of subnetworks, and more particularly a heterogeneous network, i.e. a network comprising subnetworks accessible according to different technologies. In particular, the invention relates to managing a transfer of a communication from a terminal from one subnetwork to another in such a network.

BACKGROUND

It is increasingly important to be able to offer users of a communication network an appropriate quality of service, while allowing mobility during a communication.

To this end, the IEEE (for Institute of Electrical and Electronics Engineers) Committee, and more particularly the entity IEEE 802.21, is proposing a communication network adapted to manage automatic transfer of communications from one subnetwork to another subnetwork of the heterogeneous network in question, regardless of the media used. Such management is referred to as 'Media Independent Handover (MIH)'.

A MIH function can manage, for a communication that is already set up, a transfer from a subnetwork functioning according to a first access technology (layer 2 of the OSI model) to a subnetwork functioning according to another access technology, in order to offer a mobility for the user within a heterogeneous network.

Therefore, a terminal having an IP ('Internet Protocol') session set up for example via a network access point of the Wi-Fi type may be forced to be transferred to a network access point of the GSM (for 'Global System for Mobile Communication') type, either because the terminal is moving and the Wi-Fi access point is no longer adapted to the new location of the terminal (i.e. the terminal is leaving the area of coverage of the WiFi access point), or even because the initial communication of the Wi-Fi type encounters transmission problems (i.e. the quality of service can no longer be assured).

This MIH function is more particularly positioned between a level 2 layer, according to the OSI (for Open Systems Interconnection) model, of the protocol stack for wireless communication and a level 3 layer according to the OSI model, of the IP communication protocol stack. It can therefore correspond to a level 2.5 layer located between the network layer and the data link layer of the OSI model.

In particular, it is stipulated that the MIH function should be capable of communicating with different protocols of the IP type, such as 'SIP' (for 'Session Initiation Protocol') for signalling, such as 'Mobile IP' for managing mobility, or even such as 'Diffserv' and 'IntServ' for managing the quality of service, or QoS.

However, such a MIH function is designed for connectivities of the client-network type. The result of this is that the transfer of a communication from one subnetwork to another subnetwork is limited by the technology associated with each of the access points of the subnetworks, as well as by the resources which are associated with the subnetworks for each of these access points.

More particularly, in such an architecture, a terminal can have access only to subnetworks of the heterogeneous network for which the access points are likely to provide an access to the terminal, i.e. access points in the area of coverage for which the terminal is located and which moreover offer an access technology compatible with the access capacities of the terminal in question.

Consequently, in such conditions, the use of a heterogeneous network is not always optimal.

This invention will improve the situation, by introducing more flexibility into the transfer of technology during a communication set up in a heterogeneous network and while thus allowing more optimal use of the resources offered in the whole of this network. In these conditions, it is also possible to increase the QoS of a communication.

SUMMARY

A first aspect of this invention proposes a method for managing a communication of a first terminal in a communication network comprising subnetworks;
said first terminal being capable of communicating with at least one second terminal;
at least one subnetwork of the network being accessible via said second terminal;
said method comprising the following steps at the first terminal:
/a/ receiving from the second terminal, data relating to the resources of said subnetwork accessible via the second terminal; and
/b/ selecting, on the basis of said data, a subnetwork for the communication of the first terminal from a group of subnetworks of the network comprising at least said subnetwork accessible via the second terminal.

This invention can advantageously be applied if the network in question is a heterogeneous network, i.e. a network comprising several subnetworks which can be of different access and transmission technologies (for example, a subnetwork according to a wire technology, and a subnetwork according to a wireless technology). A heterogeneous network can therefore offer different types of communication to a terminal. Moreover, at a given instant, according to the use of the transmission resources of each of the subnetworks of the heterogeneous network, these subnetworks can offer different qualities of service.

Here, the term 'subnetwork accessible via the second terminal' means the fact that the second terminal has a direct access to the subnetwork in question, i.e. that this second terminal is in the area of coverage of this subnetwork. The accessibility cited here therefore does not involve a proxy terminal within the meaning of this invention.

Here, therefore, it is possible to offer a great flexibility of access to a terminal.

However, it is possible that the terminal has a direct access to a subnetwork which only offers it a communication having a low level of quality of service, and that no other direct access available would be satisfactory with regard to the pending communication, although, within the network, there would be other subnetworks capable of offering it a satisfactory quality of service. In an architecture of the prior art, the terminal is then content with the level of quality of service which offers it the only subnetwork which is directly accessible to it.

Thanks to the characteristics cited in the above management method, it is possible to optimise the service offered by such a network, while offering to the terminal in question one or more accesses to the network via one or more other subnetworks already connected to this second terminal. If this first terminal can communicate with a plurality of other terminals, each of these terminals having access to at least one subnetwork of the network, the first terminal can advantageously select that one of the subnetworks thus accessible via at least one other terminal, which is most suited to the constraints of the communication in question.

Thus, the second terminal cited above has a role of agent, or also 'proxy', for the first terminal in question. This second terminal is advantageously capable of offering an access to one or more subnetworks of the network. This access can also be offered via one or more other terminals, which then allow the first terminal to communicate with the second terminal.

In such an architecture, the use of the resources of a heterogeneous network can then be optimised, by increasing the flexibility of access to this network, while taking into consideration the level of quality of service of the managed communication. More flexibility of access to the first terminal can moreover be offered, in particular if the latter is not suitable for communicating according to all the technologies of the subnetworks of the heterogeneous network.

In such an architecture, the second terminal can detect that the communication from the first terminal can advantageously be implemented via one or more other subnetworks which are accessible via this second terminal.

Therefore, in these conditions, not only the first terminal is capable of accessing a subnetwork via the second terminal, without which this access would be impossible, or certainly at least in conditions of inferior quality, but moreover, this second terminal can offer it an access to a different group of subnetworks within the network in question. This flexibility allows an ideal use of the resources offered in a network, particularly heterogeneous.

In this way, the second terminal, or proxy terminal, is adapted to manage and thus provide to the first terminal data relating to a group of subnetworks to which it has an access. Thus, unlike the prior architecture, it is here possible to offer to the first terminal a choice of accesses to different subnetworks in a centralised manner at the second terminal, or proxy terminal, which can provide it with a more global view of the network than the view from each of the subnetworks individually.

Access to this type of data relating to resources of the different subnetworks accessible via the second terminal allows an ideal use of the resources of the network regarding a given communication.

The characteristics cited above regarding the method of management according to one embodiment of this invention, make it possible to manage either a communication set-up from the first terminal, or even a communication transfer from a first subnetwork to a second subnetwork in the network.

The first terminal can also communicate with the second terminal via at least one third terminal, the data exchanged between the first and second terminals transiting via at least the third terminal.

It can therefore be stipulated that the first terminal be distant from the second terminal but that, even in these conditions, it could advantageously use the second terminal as proxy while communicating with it via one or more other terminals.

In one embodiment of this invention, all the subnetworks comprise a first sub-set of subnetworks accessible via the second terminal and a second sub-set of subnetworks accessible directly by the first terminal; and data received by the first terminal at step /a/ relates to the resources of the first sub-set. The method then comprises moreover the following step between the step /a/ and the step /b/, at the first terminal:

receiving from the second sub-set other data relating to the transmission resources of the subnetworks of the second sub-set, in which the step /b/ is implemented moreover on the basis of said other data.

Thus, before implementing a transfer of a communication already set up or even before setting up the communication from the first terminal initially, the terminal can take into account data relating to the transmission resources of the subnetwork(s) which are accessible to it via the second terminal, as well as the transmission resources of the subnetwork(s) which are accessible directly from the first terminal. This flexibility in access to the network thus proposed makes it possible to increase the level of quality of service which is attached to the communication from the first terminal, whether at this stage this is a communication already set up or a communication to be set up for the first terminal.

If the communication from the first terminal is not yet set up, this can be done, according to one embodiment of the invention, via the selected subnetwork, whether this subnetwork is directly accessible by the first terminal or indirectly via the second terminal.

If, a first subnetwork being accessible by the first terminal, the communication is set up from the first terminal by this first subnetwork; said method can moreover comprise the following steps, before step /a/, at the first terminal:

/1/ receiving, from the second terminal, a message indicating the possibility of a communication between the first and second terminals;

/2/ requesting from the second terminal, data relating to the resources of the at least one subnetwork accessible via the second terminal; and the following step after step /b/:

/3/ transferring the communication of the first terminal from the first subnetwork to the selected subnetwork.

Here, advantageously, although the communication from the first terminal is already set up and transits by a first subnetwork, the first terminal is informed of the fact that this communication can be continued via the second terminal in order to transit by a second subnetwork. At this stage, it can then request data relating to the resources of the network. Here, it can moreover request, from the first subnetwork, data relating to the resources of the second subnetwork.

Then, on the basis of the data relating to the resources of the different subnetworks which are offered in order to continue its communication, a decision to transfer the communication can then be taken, in order to improve the quality of this communication.

In one embodiment of this invention, the communication is set up from the first terminal via the second terminal by the at least one subnetwork accessible via the second terminal, said method comprising the following steps at the first terminal:

/4/ receiving, from the first subnetwork, a message indicating the possibility of a communication between the first terminal and the first subnetwork, and /5/ requesting from the first subnetwork, data relating to the resources of the first subnetwork, in which it is decided to transfer the communication of the first terminal from the second subnetwork to the first subnetwork on the basis of the data requested at step /5/.

Thus, advantageously, it is stipulated to be able to switch a communication from a second subnetwork accessible via a proxy terminal to a first subnetwork which is accessible to it directly, i.e. without using an intermediate terminal allowing the network access in question.

The data relating to the transmission resources can indicate a type of access or a throughput value or a loading level relatively to the corresponding subnetwork.

Advantageously, the data relating to the resources of the at least one subnetwork accessible via the second terminal is stored at the second terminal.

Such a characteristic allows a proxy terminal according to one embodiment a great responsiveness in handling requests received by the other terminal(s). Indeed, in this way, the proxy terminal has no need to request this data relating to resources from the subnetwork(s) to which it has access before informing the other terminals of this.

A second aspect of this invention proposes a method corresponding to that of the first aspect implemented at a terminal of the proxy type.

In this way, a method is proposed for managing a communication of a first terminal in a communication network comprising subnetworks;
said first terminal being capable of communicating with at least one second terminal;
at least one subnetwork being accessible via said second terminal; said method of management comprising the following steps at the second terminal:
/a/ receiving a request from the first terminal requesting data relating to the resources of the at least one subnetwork accessible via the second terminal;
/b/ responding by sending to the first terminal said data relating to the resources of the at least one accessible subnetwork.

The following steps can moreover be stipulated before step /a/:
/1/ detecting the possibility of a communication with the first terminal;
/2/ informing the first terminal of said communication possibility.

In an embodiment of this invention, it is stipulated that the first terminal communicates with the second terminal via at least a third terminal, the data exchanged between the first and second terminals transiting via at least the third terminal.

Such a method can moreover comprise the following steps at the second terminal:
/i/ receiving from the first terminal a request to set up a communication in the at least one accessible subnetwork;
/ii/ managing the set-up of the communication of the first terminal in the at least one subnetwork accessible via the second terminal.

The second terminal can advantageously update the data relating to the resources of the at least one accessible subnetwork on the basis of messages received from the at least one accessible subnetwork.

The second terminal can advantageously store locally the data relating to the resources of the at least one accessible subnetwork.

A third aspect of this invention proposes a terminal in a communication network comprising subnetworks;
said terminal being capable of communicating with at least one other terminal;
at least one subnetwork being accessible via said other terminal; said terminal comprising:
a reception entity adapted to receiving from the other terminal, data relating to the resources of said subnetwork accessible via the other terminal; and
a selection entity adapted to select, on the basis of said data, a subnetwork for a communication from a set of subnetworks comprising at least said subnetwork accessible via the other terminal.

A fourth aspect of this invention proposes a terminal of the proxy type. This terminal is adapted for a communication network (10) comprising subnetworks (M,N);
said terminal being capable of communicating with at least one other terminal;
at least one subnetwork (M) being accessible via said terminal; said terminal comprising:
a reception entity adapted to receive a request from the other terminal requesting data relating to the resources of the at least one accessible subnetwork;
a sending entity adapted to respond by transmitting to the other terminal said data relating to the resources of the at least one accessible subnetwork.

This terminal can moreover comprise:
a detection entity adapted to detect the possibility of a communication with the other terminal; and
in which the emission entity is adapted to inform the other terminal of said possibility of communication.

It can also comprise a storage entity adapted to store data relating to the resources of the at least one accessible subnetwork.

The data stored in the storage entity can be updated based on the messages received from the at least one subnetwork accessible at the reception entity.

A fifth aspect of this invention proposes a network comprising subnetworks; a first terminal according to the third aspect of this invention and a second terminal according to the fourth aspect of this invention.

Other aspects, purposes and advantages of the invention will become apparent on reading the description of one of its embodiments.

BRIEF DESCRIPTION OF THE DRAWINGS

The invention will also be better understood with the aid of the drawings, in which:
FIGS. 1-A and 1-B show a heterogeneous network according to one embodiment of this invention.

DETAILED DESCRIPTION

Figure 1A:
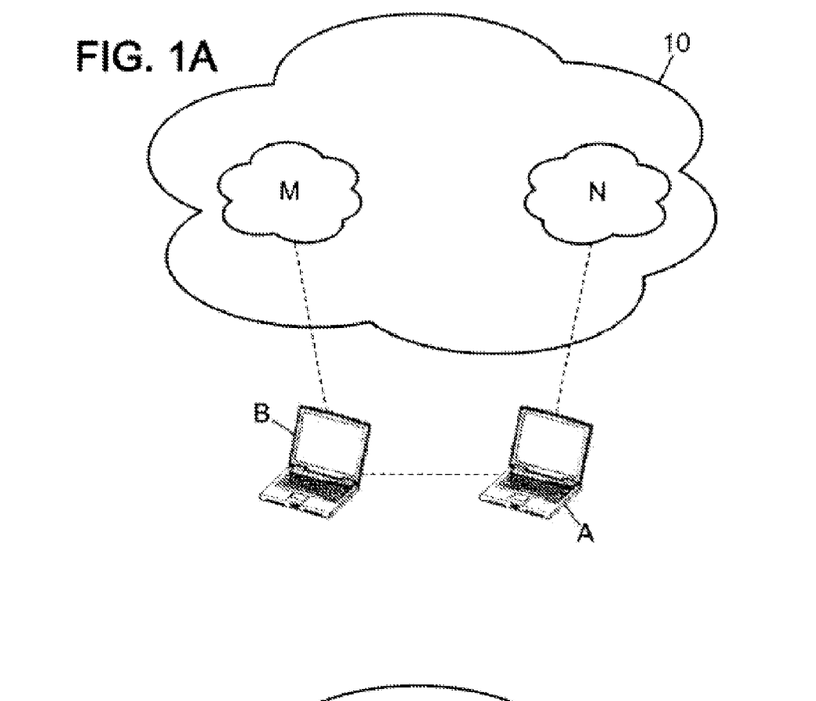

FIG. 1-A shows a network according to one embodiment of this invention. Such a network 10 comprises a first subnetwork N and a second subnetwork M. This network 10 offers a communication service to a plurality of terminals, only terminals A and B being shown. The terminal A can potentially have a communication either directly via the subnetwork N, or via the subnetwork M via the terminal B, which operates for it as proxy terminal. The subnetworks N and M can be subnetworks of the same access technology (for example, two WiFi subnetworks) or subnetworks of different technologies (for examples, a Wi-Fi network and a UMTS network).

Figure 1B:
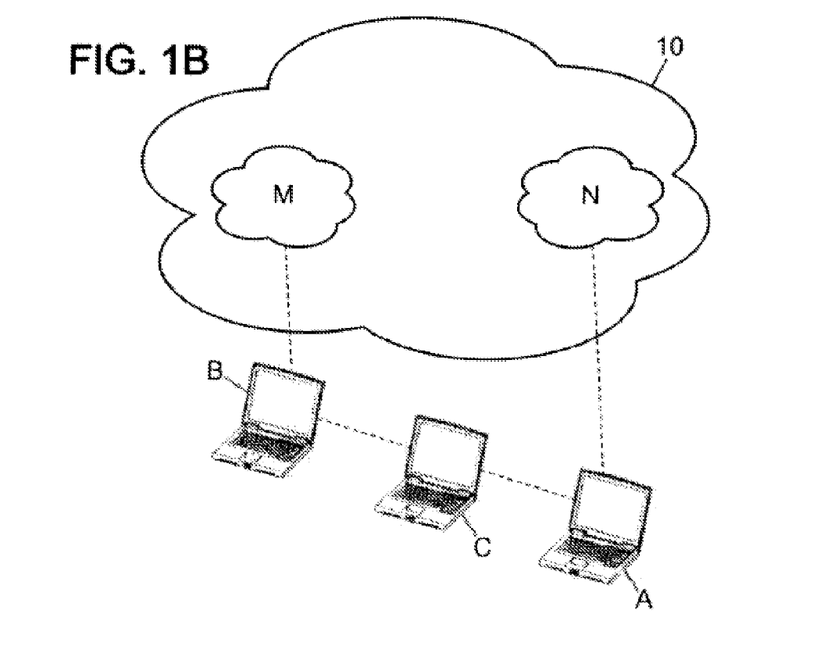

FIG. 1-B shows a network according to one embodiment of this invention, in which the terminal A can potentially have a communication either directly via the subnetwork N, or via the subnetwork M via both terminal B and terminal C.

More generally, no limitation is attached to the number of intermediate terminals, such as terminal C, which can allow terminals A and B to intercommunicate, in order that terminal B might operate as proxy terminal for terminal A.

Subsequently, for illustration only, this invention is described in its application to a heterogeneous network of the MIH type according to the IEEE's standard 802.21.

Figure 2:
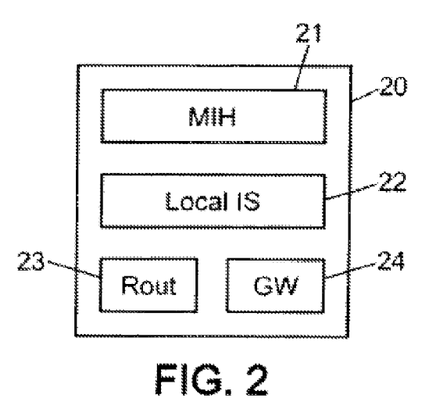
FIG. 2 shows a protocol stack for a terminal according to one embodiment of this invention.

FIG. 2 shows a part 20 of the protocol stack which a terminal according to one embodiment of this invention has; This part 20 can correspond to a specific MIH function for the terminals, hereafter referred to as 'MIH Term', in the context of a heterogeneous network based on the MIH function as defined by the IEEE's 802.21 standard.

This part 20 of the protocol stack comprises a layer 21 which can be similar to the MIH function as defined by the IEEE's 802.21 standard, a 'Local IS' for 'Local Information Service' layer 22 and two equivalent level layers, a routing layer 23 and a gateway detector layer 24.

The LIS 22 layer is a layer which comprises the data relating to a multi-hop environment for the terminal in question, i.e. the possibility offered according to one embodiment of this invention to communicate from one terminal via another terminal.

In one embodiment of this invention, this layer 22 is included in the protocol stack for a terminal, whether the latter has a role of agent or whether the latter is searching for a network access. It can be stipulated that at least a part of the terminals of the heterogeneous network could be adapted both for an agent role and to use the service of an agent terminal. However, it can also be advantageous to stipulate a type of terminal which is adapted to use the agent service offered by a proxy terminal according to one embodiment of this invention, without however bring adapted to play a proxy role itself. No limitation is attached to this invention as regards this aspect.

Thus, at a terminal operating as proxy terminal, this layer 22 is adapted to provide data relating to the subnetworks of the heterogeneous network which are accessible by the proxy terminal (but which potentially are not directly accessible par another terminal).

At a terminal seeking to use a proxy terminal to access the heterogeneous network, this layer 22 is adapted to store data relating to the subnetworks of the heterogeneous network which are accessible by the proxy terminal(s) with which the terminal in question can communicate.

The data stored within this layer 22 can be as follows:
the type of access point or access points which are accessible from the terminal in question via a proxy terminal;
the throughput which is offered in the subnetwork(s) accessible via a proxy terminal, by the respective access point(s);
the load which is effective in the subnetwork(s) accessible via a proxy terminal, by the respective access point(s).

No limitation is attached to the type of this data stored in this layer LIS 22, in the context of this invention.

The type of this data may certainly depend on the type of subnetwork(s) to which it is related. Thus, if the subnetwork is of the GSM (for 'Global System for Mobile communications') type, a cell identifier, or also cell ID to which the proxy terminal has access, can be advantageously stored in this layer.

In the case of a subnetwork according to the 802.11 standard as defined by the IEEE, a datum relating to the SSID, for 'Service Set Identifier', can be stored in a similar manner in this layer. It is the same for a subnetwork according to the 802.16 standard as defined by the IEEE, relating to the BSID datum, for 'Base Station.

This data can be obtained from a GIS (for 'Global Information Service') layer which is included in the protocol stack stipulated at the network entities level by the IEEE 802.21 standard, or also at the points of access to the subnetworks of the heterogeneous network in question.

Thus, when a terminal according to one embodiment of this invention is capable of communicating with a network entity, such as a base station or a point of access of a subnetwork of the heterogeneous network, it can be stipulated that the terminal receives from this network entity the data relating to the resources of the corresponding subnetwork in order to store this data locally in the LIS 22 layer. After such a step, this terminal has an updated LIS 22 layer and can play a proxy role for another terminal which would be capable of communicating with it.

In one embodiment of this invention, when this terminal detects that it is capable of communicating with another terminal, it informs the latter of this in order to offer it a proxy service for an access to the heterogeneous network. Next, this other terminal can then decide to request more data in order to decide whether or not to use this terminal as proxy.

The routing layer 23 is responsible for detecting routes between terminals accessing the heterogeneous network 10, then setting up these detected routes.

No limitation is attached to the type of these routes with regard to this invention. Thus, it is possible to stipulate that such a route could be based on a first type of interface between a terminal A of the communication and the first terminal to which it is connected, then it can be based on a second type of interface between the first terminal and the next terminal, up to the proxy terminal having access to a subnetwork. The first type of interface and the second type of interface can be identical, such as, for example, an interface of the WiFi type, or different, such as, for example, a first interface of the WiFi type and a second interface of the Bluetooth type.

The gateway detection layer 24 is responsible for detecting routes with multiple hops, i.e. routes between a terminal and a subnetwork of the heterogeneous network which can make it possible subsequently to offer an access to another terminal by a route with multiple hops. This layer 24 allows an interface between the LIS layer 22 of the 'MIH term' part 20 and the GIS layer of the MIH part of a network entity, such as, for example, a base station or a network access point, according to the type of technology used in the corresponding subnetwork. This layer is also responsible for setting up from end to end such a route with multiple hops.

It is also possible to stipulate the meeting of these two layers in one single layer, the gateway detection layer 24 then being capable of being considered as a part of the routing layer 23.

Figure 3:
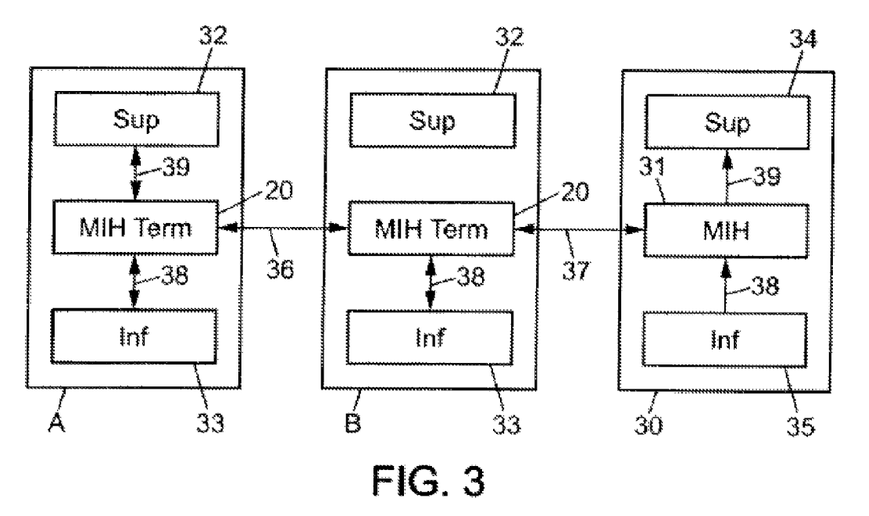
FIG. 3 shows a network architecture with respect to protocol stacks according to one embodiment of this invention.

FIG. 3 shows a network architecture for protocol stacks according to one embodiment of this invention.

In this FIG. 3, the terminals A and B, as well as a network entity 30, are shown in the form of their respective protocol stacks.

In the example shown here, it is considered that the terminal A has access to the subnetwork M by the network entity 30 via the terminal B which therefore plays an agent role for the terminal A. The terminal B is not part of the infrastructure of the subnetwork M, and therefore is not a PoA/PoS (for 'Point of Attachment/Point of Service') as meant by the 802.21 standard.

For the part of the terminals A and B, the protocol stack comprises layers from the lower level 'Inf' 33, above which is situated the part of the protocol layer 20 'MIH Term', above which are again positioned the upper layers 'Sup' 32.

For the part of the network entity 30, the protocol stack comprises layers from the lower level 'Inf' 35, above which a layer MIH 31, above which upper layers 'Sup' 34.

In the context of a heterogeneous network of the MIH type, it is provided to use service messages, or MI (for 'Media Independent') services, which are of different types such as the following:

event type ('Event'); and
command type ('Command').

The data exchanged in messages of the 'Event' type is used specifically for the management of a change of state of a link for a communication between a terminal and a subnetwork, such as loss of a link 'Link Down', detection of a link 'Link Up', or degradation of a link 'Link Going Down'. In the context of this invention, it is possible advantageously to stipulate exchanging this data for the management of a change of state of a link for a communication between two terminals.

The data exchanged in messages of the 'Command' type is used specifically to control a link transfer 'Switch', to request a status 'Get Status', or also for the configuration of a link 'Configure' or configuration of a threshold value related to events connected with links 'Configure Threshold'.

Data relating to service events can be received from the layer Inf 33, by the part of the protocol stack 20 according to a transmission 38, then from this part MIH Term, this data can be transmitted to the layers Sup 32 according to a transmission 39 and to a part 20 of another terminal according to a transmission 36.

On the basis of such service events exchanged with a second terminal, a first terminal can decide in an independent manner to implement a transfer of subnetwork for its communication, or again it can select if need be a subnetwork used to initiate a communication among all the subnetworks which are accessible to it, either directly or via a second terminal which then plays a proxy role for it.

No limitation is attached to the number of potential proxy terminals which can allow this first terminal to access a subnetwork of the heterogeneous network 10. Indeed, it can be stipulated that the first terminal receives from all the terminals which can play the role of proxy and with which a communication is possible, data relating to the resources of the subnetworks to which they have access respectively.

In one architecture according to one embodiment of this invention, data from messages of the 'Event' type can advantageously transit from the terminal A via the part of the protocol layer 20 of the proxy terminal B in order to be routed as far as a layer MIH 31 of the network entity 30, via the transmissions 36 and 37 successively.

Data from messages of the 'Command' type can be received from the layer Sup 32, by the part of the protocol stack 20 according to a transmission 39, then from this part MIH Term 20, this data can be transmitted to the layers Inf 33 according to a transmission 38 and to a part 20 of another terminal according to a transmission 36.

On the basis of such data of the 'Command' type, a terminal can determine the status of a link, it can control a link transfer or also control a multi-mode terminal, i.e. a terminal which is adapted to manage different communication technologies, such as, for example, a technology of the WiFi type or also a technology of the Bluetooth type.

Via the part 20 of the protocol layer of the terminal B, acting here as proxy terminal, the terminal A and the network entity are capable of exchanging a command either from the network entity to the terminal A, or from the terminal A to the network entity.

In such a context, it is possible to locate the taking of a link transfer decision at the terminal or at a subnetwork. In this latter case, a link transfer command can be transmitted from a network entity to the terminal A either directly, or via the terminal B.

It can here be stipulated advantageously that the bidirectional transmission 36 could be used for the exchange of data only between the terminal A and the terminal B in order to optimise certain functions.

Thus, for example, it can be stipulated that the terminal A sends a message of the 'Command' type to the terminal B to request a communication of the video type, demanding a certain level of quality of service. Thus, even if the terminal B is not capable of offering it, as proxy terminal, a route allowing such a level of quality of service, it takes this request into account in order to be able to notify terminal A of the detection of a route which might be suitable for it as soon as possible. Therefore, the terminal B stores this type of request for terminal A and informs it as soon as this request can be satisfied by sending it a message. On receipt of this last message, the terminal A can then decide to implement its communication of the video type via the terminal B or not.

Moreover, it can also be stipulated advantageously that, when a communication is set up from terminal A via terminal B as proxy terminal, terminal A informs terminal B when it no longer wants to use the communication route via the terminal B. In this way, the terminal can optimise the offer of its resources for any other communications via itself.

Data of the 'information' type exchanged is used specifically as data required to decide on a link transfer. This data exchanged between the terminals and the entities of the network are such as to allow these terminals and network entities to acquire a global vision of the heterogeneous network in order to optimise in this way a link transfer decision in this type of network.

More particularly, in one embodiment of this invention, by the exchange of messages of the 'Information Request' and 'Information Response' type between terminal A and terminal B, terminal A can obtain from terminal B data concerning the subnetworks to which it has access, such as, for example, the list of these subnetworks, the map of the adjoining subnetworks, as well as data concerning the network entities of these different subnetworks. These exchanges of messages can be relative to an address for an access point, or they can be relative to a throughput, or also to specific information from builders.

This type of information is stored in the Global Information Service layer, or GIS of a network entity according to the IEEE 802.21 standard.

The LIS 22 layer is part of the part 20 of the protocol stack intended for terminals according to one embodiment of this invention and allows two terminals to interchange data which is stored in a local manner at the terminals respectively.

It can be stipulated that the data between the GIS layer of a network entity and the LIS layer of a terminal, or between two LIS layers of two respective terminals, is exchanged via a message of the 'HELLO' type, which is defined at level 3 according to the OSI model, in the document "Optimized link state routing protocol", by P. Jacquet and T. Clausen, Internet RFC 3626, 2004. It can also be stipulated that this data be exchanged via a tag message as defined at level 2 according to the OSI model, or again by using one or more messages as defined by a routing protocol adapted for a wireless communication between terminals, i.e. adapted to an ad hoc network. The data from the LIS layer is stored at the terminal and shared with other terminals, preferably on request.

At a given terminal, this LIS data can correspond specifically to a list of subnetworks either directly or via a proxy terminal, a topology relating to the location of neighbouring terminals, i.e. terminals with which the given terminal can communicate, a level of QoS which can be offered in the subnetworks listed. No limitation is attached to this invention as regards the list of data stored at the LIS layer level.

This LIS layer advantageously allows a terminal to play a proxy role to allow another terminal to be connected to a subnetwork to which it does not have access directly, because it has no direct access to a subnetwork of the heterogeneous network, or again, for example, because the subnetwork(s) to which it has access offer(s) a level of QoS that is inferior or even inadequate for its future communication, either for set-up or while communicating, i.e. in the context of a link transfer.

Figure 4:
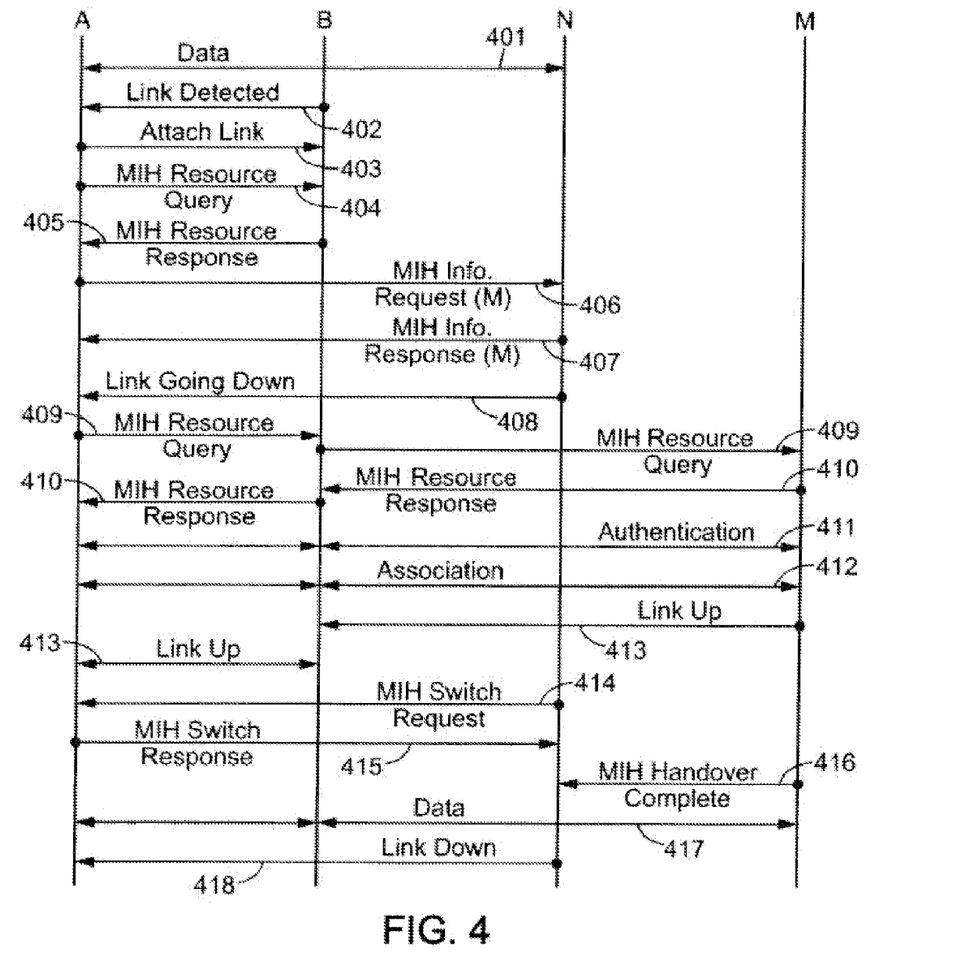
FIG. 4 shows an exchange of messages according to one embodiment of this invention, during which a link transfer is implemented to a communication by proxy terminal.

FIG. 4 shows an exchange of messages according to one embodiment of this invention, during which a link transfer is implemented to a communication by proxy terminal. In the scenario as shown here, a communication 401 is set up between terminal A and subnetwork N, this communication being direct, i.e. not transiting via a proxy terminal.

Terminal B is adapted to detect both the possibility of communicating with a network entity of a subnetwork of the heterogeneous network and the possibility of communicating with another terminal of this heterogeneous network.

The possibility of communicating with terminal A is detected here at terminal B and consequently terminal B sends a message of the type 'Link Detected' 402 addressed to terminal A. This event can occur, for example, f terminal A and/or terminal B are moving, or even if the radio context between these two terminals has been changed for any reason.

On receipt of this message, terminal A responds by sending an 'Attach Link' message 403, followed by a 'MIH Resource Query' message 404 addressed to terminal B. This latter message is intended to request from this terminal B data relating to the resources of the subnetwork(s) to which terminal B has access.

Terminal B then recovers the data stored in its part of the protocol layer 20, and sends it to terminal A by sending a message 405 'MIH Resource Response'.

In this example, terminal B has access to the subnetwork M. If this terminal B had access to a plurality of subnetworks of the heterogeneous network, this message 405 could then advantageously contain data relating to all these subnetworks accessible for it.

In order to complement the data received in the message 405 relating to the subnetwork M, the terminal can moreover request data relating to this subnetwork M from the subnetwork N to which it has access and, more particularly here, via which it is in communication.

To this end, terminal A sends an 'MIH Info Request (M)' message 406 addressed to the network entity of the subnetwork N which is responsible for the communication 401 from terminal A. It receives as response from this entity a 'MIH Info Response (M)' message 407 which contains the data relating to the resources in the subnetwork M.

At this stage, terminal A stores in its part of the protocol layer 20 this data relating to the subnetwork M.

Then, because the link between the subnetwork N and terminal A is suffering degradation as a result, a message 408 of the event type 'Link going down' is received at terminal A from the subnetwork N.

On receipt of this information, terminal A relies on the data stored in its part of the protocol layer 20 to decide whether it is preferable that its communication 401 be continued via terminal B and subnetwork M. If it seems preferable to operate such a transfer of its communication, it sends, addressed to terminal B, a 'MIH Resource Query' message 409 intending to reserve resources in subnetwork M to allow its communication to be continued later in this subnetwork M.

Terminal B receives this message 409 and sends it addressed to subnetwork M. The subnetwork M then responds to this message 409 by sending a 'MIH Resource Response' message 410, which transits via terminal B as far as terminal A.

Then, a step intending to authenticate terminal A with subnetwork M and another step intending to associate it with this are implemented through an exchange of messages 411 and an exchange of messages 412 respectively, these exchanges of messages transiting via the terminal B.

The link required between terminal B and subnetwork M for the communication from terminal A is then detected in an operational state and, therefore, a 'Link Up' message 413 is then sent from subnetwork M to terminal B, which sends it to terminal A.

At this stage, subnetwork N triggers an effective transfer of the communication 401 from terminal A by sending, addressed to terminal A, a 'MIH Switch Request' message 414, to which terminal A responds with a 'MIH Switch Response' message 415.

The transfer of the communication is then implemented and subnetwork M sends a 'MIH Handover Complete' message 416 addressed to subnetwork N.

In this way, the communication 401 from terminal A in subnetwork N is then transferred into a communication 417 in subnetwork M via terminal B.

The subnetwork N then sends a message 418 informing terminal A that the link with it is lost—'Link Down'.

Figure 5:
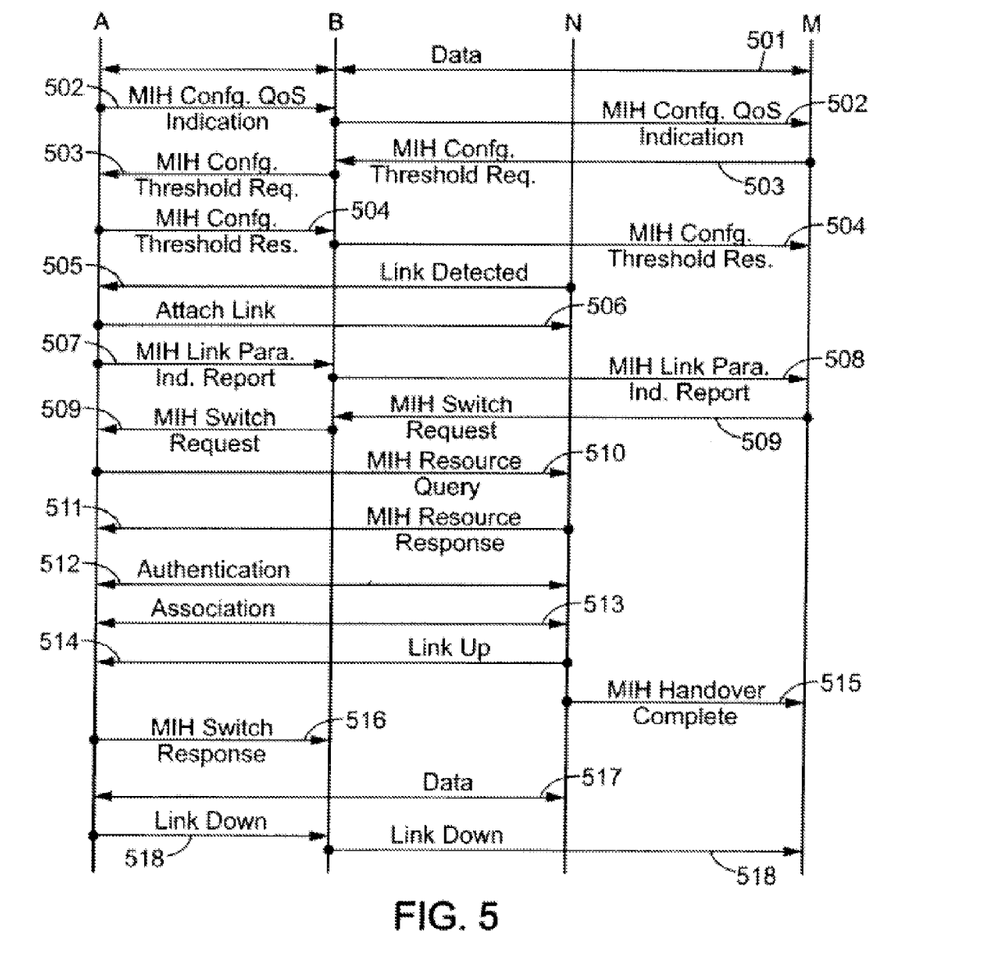
FIG. 5 shows an exchange of messages according to one embodiment of this invention, during which a link transfer is implemented to a direct communication.

FIG. 5 shows an exchange of messages according to one embodiment of this invention, during which a link transfer to a direct communication is implemented.

In the example shown here, the communication 501 from terminal A transits via terminal B as far as subnetwork M.

Terminal A sends, addressed to terminal B, a 'MIH Confg. QoS Indication' message 504, this message being transferred as far as the subnetwork M. It gives data relating to a desired quality of service (or QoS) level for the ongoing communication 501. The subnetwork M is then able to configure, on this terminal A, threshold values which are determined on the basis of the level of quality of service indicated in the message 502. In order to configure terminal A on the basis of these threshold values, the subnetwork M sends, addressed to terminal A, via terminal B a 'MIH Threshold Request' message 503. Terminal A answers this, via terminal B, by sending a 'MIH Threshold Response' message 504.

These threshold values are used in the management of the decision taking related to a communication transfer.

Then, during this communication 501, terminal A and the subnetwork are able to intercommunicate, either because terminal A has changed location or because the radio context between the network entity of the subnetwork N and the terminal has been changed.

The subnetwork N then sends a 'Link Detected' message 505 addressed to terminal A to inform it of this. Terminal A responds to this information by sending a 'Link Attach' message 506 addressed to the subnetwork N.

Terminal A then informs the subnetwork M via terminal B relating to the level of quality of service of the link which is used for its communication 501. To this end, it sends a 'MIH Link Parameter Indication Report' message 507.

On receipt of this message, the subnetwork M is able to decide whether a communication transfer from terminal A would be preferable or not.

If it is then decided to command such a transfer, the subnetwork M sends a 'MIH Switch Request' message 509, this message transiting by terminal B before being received by terminal A. On receipt of this message 509, terminal A then prepares for the transfer of its communication 501, while reserving resources in the subnetwork N by sending, addressed to this latter, a 'MIH Resource Query' message 510. The subnetwork N responds to this by sending a 'MIH Resource Response' message 511.

After this phase of reservation of resources in subnetwork N, which is accessible to it directly from terminal A, an authentication step, followed by an association step, are implemented by an exchange of messages 511 and an exchange of messages 512 respectively, between terminal A and the subnetwork N.

The link between terminal A and the subnetwork N is detected as being operational from the subnetwork N. The latter informs terminal A of this by sending a 'Link Up' message 514. The subnetwork N then informs the subnetwork M of the implementation of the transfer of the communication 501 by sending, addressed to subnetwork M, a 'MIH Handover Complete' message 515.

Terminal A then sends a 'MIH Switch Response' message 516 addressed to terminal B.

At this stage, the communication 501 from terminal A via terminal B by the subnetwork M is actually transferred to subnetwork N as direct communication 517.

Terminal A then informs subnetwork M of the fact that the link between them is lost by sending a 'Link Down' message 518, via terminal B.

Figure 6:
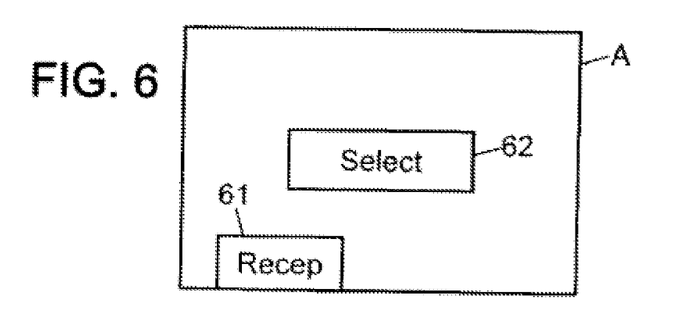
FIG. 6 shows a terminal according to one embodiment of this invention.

FIG. 6 shows a terminal according to one embodiment of this invention. This terminal A is adapted to use a communication service via another terminal. It comprises a reception entity 61 adapted to receive, from another terminal, data relating to resources of the subnetwork(s) accessible by the other terminal and a selection entity 62 adapted to select, on the basis of this data, a subnetwork for a communication among all the subnetworks accessible by the other terminal.

Figure 7:
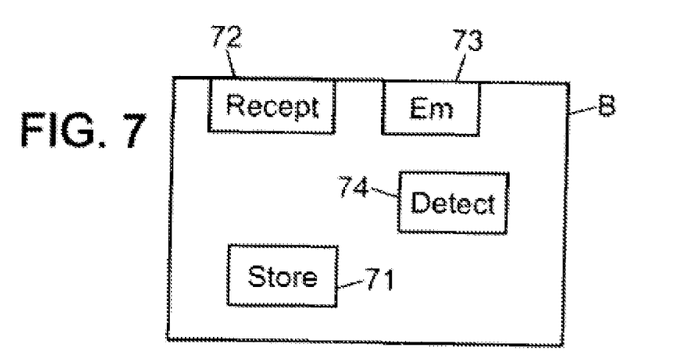
FIG. 7 shows a terminal according to one embodiment of this invention.

FIG. 7 shows a terminal according to one embodiment of this invention. This terminal B is adapted to allow another terminal a communication via itself. It comprises a storage entity 71 adapted to store data relating to the resources of the subnetwork(s) which are accessible to it, a reception entity 72 adapted to receive a query from the other terminal asking for data relating to the resources of the heterogeneous network, and a sending entity 73 adapted to respond by sending to the other terminal data relating to the resources of the at least one accessible subnetwork.

It can moreover comprise a detection entity 74 adapted to detect the possibility of a communication with the other terminal.

The following table describes different Reference Points, R1 to R6 as stipulated in the IEEE 802.21 standard.

| Reference point | Description |
| --- | --- |
| R1 | This is a reference point situated between the MIH layer of a terminal and the MIH PoS layer (for point of service) of a network entity corresponding to the access point. |
| R2 | This is a reference point situated between the MIH layer of a terminal and the MIH PoS layer of a network entity. |
| R3 | This is a reference point situated between the MIH layer of a terminal and the MIH PoS layer of a network entity which is not the access point. |
| R4 | This is a reference point situated between the MIH PoS layer of a network entity and the MIH non-PoS layer of another network entity. |
| R5 | This is a reference point situated between the MIH PoS layer of a network entity and the MIH PoS layer of another network entity. |

According to one embodiment of this invention, it is advantageous to introduce a new reference point R6 which is situated between the MIH layer of a terminal and the MIH layer of another terminal in order to allow a communication between two terminals and thus be able to implement the principles of this invention.

The invention claimed is:

1. A method for managing a communication from a first terminal in a communication network comprising subnetworks, said communication being established on a first subnetwork of the communication network, accessible via the first terminal, said first terminal being capable of communicating with at least one second terminal, at least one subnetwork being accessible via said second terminal, said method comprising the following steps at the first terminal:
/a/ receiving from the second terminal, data relating to the transmission resources of said subnetwork accessible via the second terminal offered for the communication;
/b/ selecting, on the basis of said resource data, for the communication from the first terminal, a subnetwork accessible via the second terminal among a group of subnetworks of the communication network comprising at least said subnetwork, accessible via the second terminal, wherein the quality of service offered by the selected subnetwork is greater than the quality of service of said first subnetwork;
/c/ sending to the selected subnetwork via the second terminal a request to reserve resources in said selected subnetwork; and
/d/ transferring the communication of the first terminal from the first subnetwork to said selected subnetwork accessible via the second terminal.

2. The method of management according to claim 1, wherein the first terminal communicates with the second terminal via at least a third terminal, the data exchanged between the first and second terminals transiting via at least the third terminal.

3. The method for managing a communication according to claim 1, wherein the group of subnetworks comprises a first sub-set of subnetworks accessible via the second terminal and a second sub-set of subnetworks accessible directly by the first terminal, and wherein the data received by the first terminal at step /a/ is related to the respective resources of the subnetworks of the first sub-set, said method further comprising the following step between step /a/ and step /b/, at the first terminal:
receiving from the second sub-set other data relating to the respective resources of the subnetworks of the second sub-set, wherein the step /b/ is further implemented on the basis of said other data.

4. The method for managing a communication according to claim 1, wherein the communication from the first terminal is set up initially via the selected subnetwork.

5. The method for managing a communication according to claim 1, wherein, a first subnetwork being accessible by the first terminal, the communication is set up from said first terminal by the first subnetwork of the network,
   said method further comprising the following steps, before step /a/, at the first terminal:
   /1/ receiving, from the second terminal, a message indicating the possibility of a communication between the first and second terminals;
   /2/ requesting from the second terminal, data relating to the resources of the at least one subnetwork accessible via the second terminal; and the following step after step /b/:
   /3/ transferring the communication from the first terminal from the first subnetwork to the selected subnetwork.

6. The method for managing a communication according to claim 1, wherein the communication is set up from the first terminal via the second terminal by the at least one subnetwork accessible via the second terminal, said method comprising the following steps at the first terminal:
   /4/ receiving, from the first subnetwork, a message indicating the possibility of a communication between the first terminal and the first subnetwork;
   /5/ requesting from the first subnetwork data relating to the resources of the first subnetwork, wherein it is decided to transfer the communication of the first terminal from the second subnetwork to the first subnetwork on the basis of the data requested at step /5/.

7. The method for managing a communication according to claim 1, wherein the data relating to the resources indicate a type of access or a throughput value or a level of loading relatively to the corresponding subnetwork.

8. The method for managing a communication according to claim 1, wherein the data relating to the resources of the at least one subnetwork accessible via the second terminal is stored at said second terminal.

9. A method for managing a communication of a first terminal in a communication network comprising subnetworks said communication being established on a first subnetwork of the communication network, accessible via the first terminal, said first terminal being able to communicate with at least one second terminal,
   at least one subnetwork being accessible via said second terminal,
   said method of management comprising the following steps at the second terminal:
   /a/ receiving a request from the first terminal requesting for data relating to the transmission resources of the at least one subnetwork accessible via the second terminal offered for the communication;
   /b/ responding by sending to the first terminal said data relating to the transmission resources of the at least one accessible subnetwork;
   /c/ transmitting to the selected subnetwork a request emitted by the first terminal to reserve resources in the at least one accessible subnetwork; and
   /d/ receiving the communication of the first terminal from the first subnetwork to said at least one subnetwork accessible via the second terminal wherein a subnetwork accessible via the second terminal is selected on the basis of said data relating to the transmission resources of the at least one accessible subnetwork, and wherein the quality of service offered by said selected subnetwork is greater than the quality of service of said first subnetwork.

10. The method of management according to claim 9, wherein the first terminal communicates with the second terminal via at least a third terminal, the data exchanged between the first and second terminals transiting via at least the third terminal.

11. The method of management according to claim 9, further comprising the following steps at the second terminal:
    /i/ receiving from the first terminal a request to set up a communication in the at least one accessible subnetwork;
    /ii/ managing the set-up of the communication of the first terminal in the at least one subnetwork accessible via the second terminal.

12. The method of management according to claim 9, wherein the second terminal updates the data relating to the resources of the at least one subnetwork accessible on the basis of messages received from the at least one accessible subnetwork.

13. The method of management according to claim 9, wherein the second terminal stores locally the data relating to the resources of the at least one accessible subnetwork.

14. A terminal in a communication network comprising subnetworks, said terminal establishing a communication on a first subnetwork of the communication network, accessible via the terminal, and said terminal being capable of communicating with at least one other terminal, at least one subnetwork being accessible via said other terminal, said terminal comprising:
    a reception entity adapted to receive from the other terminal data relating to the resources of said subnetwork accessible via the other terminal offered for the communication;
    a selection entity adapted to select, on the basis of said resource data, a subnetwork for a communication, a subnetwork accessible via the other terminal among a set of subnetworks of the network comprising at least said subnetwork accessible via the other terminal, wherein the quality of service offered by the selected subnetwork is greater than the quality of service of said first subnetwork;
    a sending entity adapted to send to the selected subnetwork via the other terminal a request to reserve resources in the selected subnetwork; and
    a transfer entity adapted to transfer the communication of the terminal from the first subnetwork to said at least one subnetwork accessible via the other terminal.

15. A terminal in a communication network comprising subnetworks,
    said terminal being capable of communicating with at least one other terminal, a communication being established on a first subnetwork of the communication network, accessible via the other terminal,
    at least one subnetwork being accessible via said terminal, said terminal comprising:
    a reception entity adapted to receive a request from the other terminal requesting data relating to the transmission resources of the at least one subnetwork offered for the communication;
    a sending entity adapted to respond by transmitting to the other terminal said data relating to the transmission resources of the at least one accessible subnetwork; and a transmitting entity adapted to transmit to the at least one accessible subnetwork a request emitted by the other terminal to reserve resources in said at least one accessible subnetwork;

the reception entity further adapted to receive the communication of the other terminal from the first subnetwork to said at least one subnetwork accessible via the terminal wherein a subnetwork accessible via the terminal is selected on the basis of said data relating to the resources of the at least one accessible subnetwork, wherein the quality of service offered by said selected subnetwork is greater than the quality of service of said first subnetwork.

16. The terminal according to claim 15, further comprising a storage entity adapted to store data relating to the resources of the at least one accessible subnetwork.

17. A network comprising subnetworks, a first terminal according to claim 14 and a second terminal comprising subnetworks a communication being established on a first subnetwork of the communication network, accessible via the first terminal, said first terminal being capable of communicating with at least one second terminal, at least one subnetwork being accessible via said first terminal, said second terminal comprising:

a reception entity adapted to receive a request from the first terminal requesting data relating to the transmission resources of the at least one subnetwork offered for the communication;

a sending entity adapted to respond by transmitting to the first terminal said data relating to the transmission resources of the at least one accessible subnetwork; and a transmitting entity adapted to transmit to the at least one accessible subnetwork a request emitted by the first terminal to reserve resources in said at least one accessible subnetwork;

the reception entity further adapted to receive the communication of the first terminal from the first subnetwork to said at least one subnetwork accessible via the second terminal wherein a subnetwork accessible via the second terminal is selected on the basis of said data relating to the resources of the at least one accessible subnetwork, wherein the quality of the service offered by said selected subnetwork is greater than the quality of service of said first subnetwork.

* * * * *